Dec. 18, 1962   F. J. RAU   3,069,672
MOTOR STARTING NOISE MEASURING CIRCUIT
Filed June 10, 1958
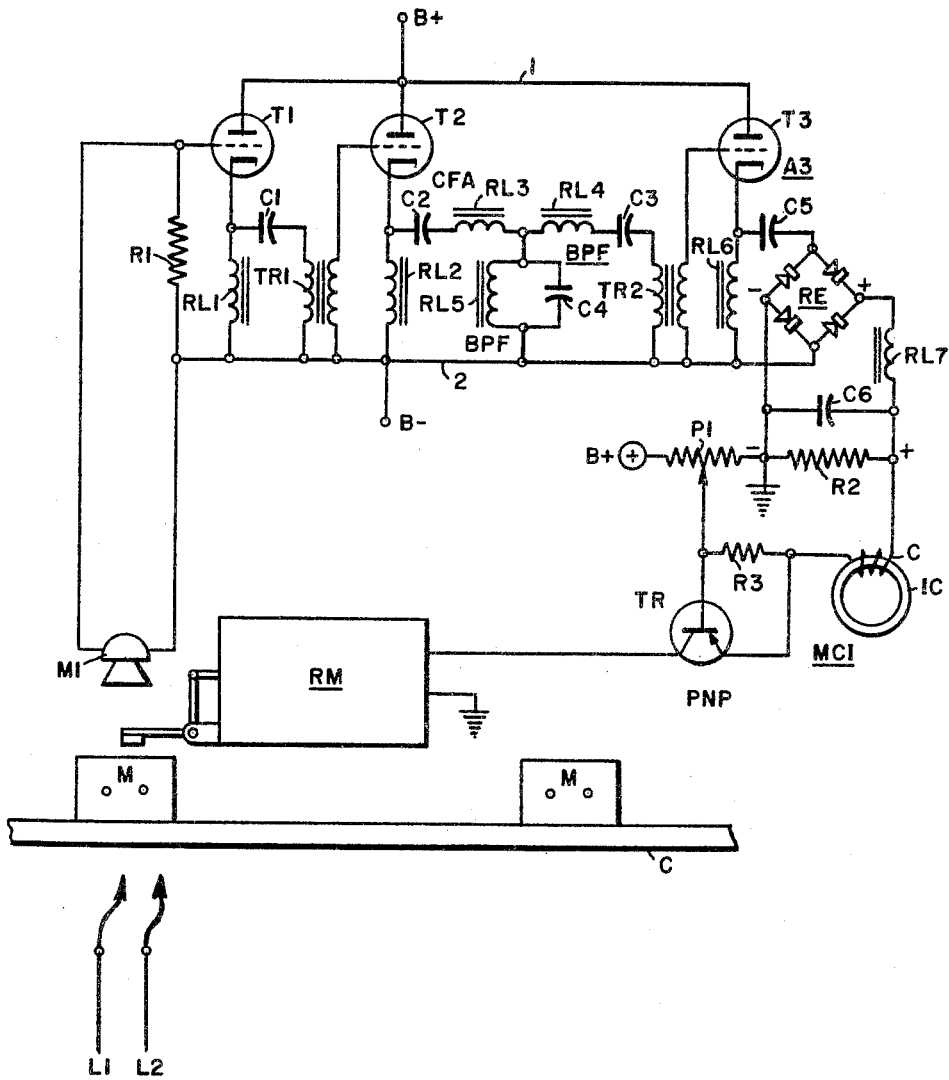
WITNESSES
John E. Hensley Jr.
Leon J. Taga
INVENTOR
Frank J. Rau
BY
Paul E. Friedemann
ATTORNEY

United States Patent Office 3,069,672
Patented Dec. 18, 1962

3,069,672
MOTOR STARTING NOISE MEASURING CIRCUIT
Frank J. Rau, Pittsburgh, Pa., assignor to Westinghouse Electric Corporation, East Pittsburgh, Pa., a corporation of Pennsylvania
Filed June 10, 1958, Ser. No. 741,062
8 Claims. (Cl. 340—261)

This invention relates to testing apparatus and more particularly to electrical apparatus for testing the starting noise of induction motors.

In the manufacture of induction motors, the motors are tested for starting noise to insure customer acceptance. This is particularly important where the motors are to be used in connection with window air conditioners. With this type of air conditioning apparatus the noise must be kept at a very low level to avoid disturbing the room occupants. This is particularly important when occupants are asleep.

The starting noise of an induction motor is produced mainly by the interaction of the magnetic field produced by the stator windings and the magnetic field produced by the induced currents in the rotor. These magnetic fields are out of phase and produce a large magnitude 240 cycle magnetic hum (consider a 60 cycle motor) which hum diminishes as the motor accelerates in speed and for all practical purposes vanishes as the motor approaches synchronous speed.

It has been established that the characteristic of the human ear is such that noises of large magnitude for short periods of time are no more objectionable than noises of lesser magnitude for longer periods of time. In fact, it appears that the degree of objectionability is not determined by the magnitude of the noise alone nor by the duration but by the product of the magnitude of the noise and the duration of the noise.

All frequencies of the starting noises are objectionable but for a 60 cycle induction motor a frequency of 240 cycles is the most pronounced objectionable frequency. In order to provide a good measurement of the starting noise of an induction motor, the amplitude of the 240 cycle hum should be integrated over the time required to bring the motor up to full speed. Such integration is thus a measure of the objectionability and if the integrated quantity is properly compared with a standard, the motors having an objectionable starting noise can be segregated from those having a non-objectionable starting noise.

In this specification a method of procedure and circuitry for carrying out the method of procedure are disclosed whereby an accurate measurement may be made of the starting noise of an induction motor and the method of procedure and the circuitry lend themselves to use in an automatic test station on a production line for automatically marking, or for automatically segregating, the motors having objectionable starting noise characteristics from those having acceptable starting noise characteristics.

It is a broad object of this invention to determine the starting noise characteristic of electrical motors.

It is a more specific object of the invention to segregate in a production line the motors having objectionable starting noise characteristics from those having acceptable starting noise characteristics.

It is also a more specific object of this invention to indicate, in a test operation for determining the starting noise characteristic of induction motors, those motors having a 240 cycle hum over a longer period than a selective period of time.

Other objects will become more apparent from the study of the following specification when made in connection with the drawing showing the circuitry used with the test procedure disclosed.

In the FIGURE, C represents a conveyor carrying motors M past the microphone MI. The arrangement is such that each time a particular motor M is adjacent the microphone the motor is connected to the leads L1 and L2 to bring it up to near synchronous speed.

As the motor accelerates from standstill to near synchronous speed, the noise the motor makes during the starting is picked up by the dynamic microphone MI and the output of the microphone is placed across the resistor R1. The resistor R1, a one meg-ohm resistor, is connected to the negative lead 2 and to the grid of the tube T1. Leads 1 and 2 are energized with a substantially constant 200 volt direct current voltage.

As the electrical signal from the microphone is applied to the resistor R1, the amplifier tube T1, a 6J5 tube is caused to amplify the signal and supply it through reactor RL1 of 35 henries and capacitor C1 of .01 microfarad to the primary winding of transformer TR1. The secondary winding of transformer TR1 supplies an input signal to the cathode follower amplifier CFA which amplifier includes the type 6J5 tube T2 and reactor RL2. The transformer TR1 as well as the transformer TR2 mentioned hereinafter are UTC (United Transformer Co.) type H–10 transformers.

The output of the cathode follower amplifier CFA is supplied to the band pass filter BPF comprising the capacitors C2, C3 and C4, reactors RL3, RL4 and RL5, and the primary winding of the transformer TR2 which in turn supplies the grid signal to the third amplifier A3 comprising the tube T3, and reactor RL6, and capacitor C5. The output from the third stage amplifier A3 is supplied to the alternating current terminals of the full-wave rectifier RE which supplies its direct current output to the filters of the circuit comprising capacitors C6 and reactor RL7.

Capacitors C1, C2 and C3 are .01 micro-farad capacitors, capacitor C4 has a capacity of .8 micro-farad, capacitor C5 has a capacity of 2 micro-farads and capacitor C6 has a capacity of 10 micro-farads. Reactors RL1, RL2 and RL6 have a reactance of 35 henries, reactors RL3 and RL4 have adjustable reactance, and are UTC type VIC–19, and reactor RL5 is a UTC type VIC–4.

The potentiometer P1 and resistor R2 are energized by the polarities as indicated by rectifier RE, with the resistor R2, during this starting operation of the motor, receiving an energization which in polarity and magnitude is determined by the voltage output from the rectifier RE. It will be noted that the magnetic core integrator MC1, consisting of the coil C and the iron core IC, is connected, by means of resistor R3, across all of the sections of resistor R2 and a portion of the potentiometer P1, and the connection is so made that the difference of the voltages across P1 and R2 passes through the coil C.

For the particular reduction to practice of this invention made the voltage across resistor R2 was about 65 volts and the voltage across the potentiometer P1 of about the same order and the position of the tap on the potentiometer P1 was chosen so that for a motor not having an excessive and undesirable starting noise the voltage difference across resistor R3 and the coil C of reactor MCI during the starting period was not sufficient to saturate MCI, but a motor having an excessive and undesirable starting noise during the starting period did saturate the reactor MCI. Thus the voltage across that portion of potentiometer P1 between its tap and ground is a reference standard which is differentially combined with the voltage across resistor R2, and the voltage difference therebetween is applied across the series circuit including R3 and coil C. As a result, a voltage representing this different is integrated by the integrator MCI over the accelerating period of the motor. Because the reference is constant valued D.C., the rectifier (RE) voltage across resistor R2 is effectively integrated by integrator MIC as biased by the reference standard, providing a comparison between the integrated output of the rectifier and the standard.

Resistor R1 has a resistance of 1 meg-ohm, resistor R2 has a resistance of 20K-ohms, potentiometer P1 has a resistance of 25K-ohms, and resistor R3 a resistance of 300 ohms. Tube T3 is a 6L6 type tube and the diode of full-wave rectifier RE are type 1N92. Magnetic core integrator MIC is a saturable reactor having 9 volt second saturation characteristic. The transistor TR is a type 2N43.

The magnetic core of the magnetic core integrator as mentioned is chosen and designed to absorb a given amount of volt-seconds before it saturates. If the summation amplitude-time areas of the signal produced by the starting noise of the motor is below a certain magnitude, the iron core does not saturate and in consequence, the voltage on the base of transistor TR is such as not to produce conduction through the transistor, that is it acts as an open switch. On the other hand, if the amplitude time area of the signals produced during the accelerating period of the motor is above the objectionable noise level, that is if it is large enough for the iron core IC to saturate then the bias on the base of the transistor will be such as to cause the transistor to act as a closed switch and to effect the energization of the reject mechanism RM.

From the preceding paragraph it is apparent that the magnetic core integrator has to be selected to match the starting period of the motor whose starting noise level is being investigated. There is thus a definite cooperation between the signal producing motor and the volt second saturating characteristic of the magnetic core integrator.

The voltage values mentioned for the circuitry, the circuit constants mentioned for the various elements and type designation mentioned are merely illustrative. Anyone well skilled in the art could make his own selection of circuitry and constants.

The reject mechanism may take any one of several forms. It may merely indicate, by the flashing of a light, to the attendant that the noise of the motor is objectionable. It may mark the motor by means of a stamping action as shown in the drawing, or the lever mechanism shown may actually push the motor M onto another conveyor so as to segregate the particular motor having an objectionable noise characteristic from the others being tested not having an objectionable noise characteristic. It is a desirable feature of the magnetic core integrating circuit that it will automatically reset itself, after this starting noise has been measured for a particular motor so that the next motor may be tested.

The band pass filter is selected to be responsive to 240 cycles but may be and preferably is designed to pass 240 cycle oscillations and those above and below 240 cycle over a relatively narrow range. In this manner slight variations in the supply frequency will not adversely affect the accuracy of the starting noise measurement. If the supply frequency were very accurately maintained at 60 c.p.s., then a very narrow band pass filter passing only 240 c.p.s. would be quite satisfactory but it would be needlessly expensive.

While only one embodiment of the invention has herein been disclosed, it is apparent that modifications may be made, particularly after having had the benefit of the teachings herein made, falling well within the spirit of the invention claimed.

I claim:

1. In testing apparatus for determining the noises of an electric motor during starting which are objectionable to the human ear, in combination, means for connecting an electric motor to be tested to a suitable source of electric energy to start the motor, a microphone disposed adjacent the motor to pick up the starting noises of the motor to produce an electric output as a function of the noise, amplifying means for amplifying the output of the microphone, means for filtering out all frequencies of the microphone representative of noises not objectionable to the human ear, rectifying means for rectifying the output from said amplifying means, a magnetic core integrator, a voltage reference standard of direct current potential, an output circuit, said magnetic core integrator being connected to said voltage reference standard, said output circuit, and said rectifying means to produce an output in said output circuit responsive to the difference of their potential, and means responsive to the output in said output circuit to indicate the objectionable noise level of the motor under test.

2. In testing apparatus for determining the noises of an electric motor during starting which are objectionable to the human ear, in combination, means for connecting an electric motor to be tested to a suitable source of electric energy to start the motor, a microphone disposed adjacent the motor that is being started to pick up the starting noises of the motor and produce an electrical output corresponding in frequency and amplitude to the motor starting noise, amplifying means for amplifying the output of the microphone, means for filtering out the frequencies from the output corresponding to the noises not objectionable to the human ear and retaining only those frequencies corresponding to noises within a relatively narrow range including 240 cycles per second, which range is known to be objectionable to the human ear, rectifying means for rectifying the output from said amplifying means, a magnetic core integrator, a voltage reference standard of direct current potential, an output circuit, said magnetic core integrator being connected to said reference standard, said output circuit, and said rectifying means to produce an output in said output circuit responsive to the difference of their potential, and means responsive to the output in said output circuit for rejecting the motor whose noise level of objectionable noise is above a selected value.

3. In testing apparatus for determining the noises of an electric motor during starting which are objectionable to the human ear, in combination, means for connecting an electric motor to be tested to a suitable source of electric energy to start the motor, a microphone disposed adjacent the motor being started to pick up the starting noises of the motor and to produce an alternating current electric output signal as a function of the starting noise of the motor, amplifying means for amplifying the output of the microphone, means for filtering out through a band-pass filter all frequencies corresponding to noises not objectionable to the human ear, second amplifying means for amplifying the output of the band-pass filter, rectifying means for rectifying the output from said second amplifying means, an output circuit, a magnetic core integrator, a voltage reference standard of direct current potential, said magnetic core integrator being connected to said voltage reference standard, said output circuit, and said rectifying means to produce an output in said output circuit responsive to the difference of their potential, and means responsive to said output in the output circuit to indicate the objectionable noise level of the motor under test.

4. In testing apparatus for determining the noises of an electric motor during starting which are objectionable to the human ear, in combination, means for connecting an electric motor to be tested to a suitable source of electric energy to start the motor, a microphone disposed adjacent the motor to pick up the starting noises of the motor and produce an alternating current output corresponding in frequency and amplitude to the starting noise of the motor, amplifying means for amplifying the output of the microphone, means for filtering out through a band-pass filter all frequencies corresponding to the noises not objectionable to the human ear and retaining only those frequencies corresponding to noises within a relatively narrow range of 240 cycles per second, which range is known to be objectionable to the human ear, second amplifying means for amplifying the output of the bandpass filter, rectifying means for rectifying the output from said second amplifying means, a magnetic core integrator, an output circuit, a voltage reference standard of direct current potential, said magnetic core integrator being connected to said voltage reference standard, said output circuit, and said rectifying means to produce an output in the output circuit responsive to the difference of their potential, and means responsive to said last-mentioned output for rejecting the motor whose noise level of objectionable noise is above a selected value.

5. In testing apparatus for determining the objectionable operating noise of an electric motor during the period the motor is started from rest and is accelerated to full operating speed, in combination, means for connecting an electric motor to be tested to a source of electric energy to start the motor, a dynamic microphone disposed in proximity to the motor to thus produce an alternating current output corresponding in frequency and amplitude to the starting noise of the motor, means for filtering out from the electrical output of the microphone all the frequencies produced by the motor starting noises not objectionable to the human ear, as all those frequencies corresponding to noises lying outside of a relatively narrow range including 240 cycles per second, means for rectifying the filtered output, integrating means for integrating the rectified output over the period of acceleration of the motor from rest to full speed, a voltage reference standard, means for comparing the integrated electrical output to the voltage reference standard, said voltage reference standard being matched to the accelerating period of the motor from rest to full speed, and means responsive to a selected difference between the integrated output and the output of the voltage reference standard for making an indication of the existence of such selected difference.

6. In testing apparatus for determining the objectionable operating noise of an electric motor during the period the motor is started from rest and is accelerated to operating speed, in combination, means for connecting an electric motor to be tested to a source of electric energy to start the motor, a microphone disposed in proximity to the motor to thus produce an alternating current output corresponding in frequency and amplitude to the starting noise of the motor, means for filtering out from the electrical output of the microphone all the frequencies produced by the motor starting noises not objectionable to the human ear, means for rectifying the filtered output, a voltage reference standard, difference circuit means for differentially comparing the rectified output with the reference standard, integrator means coupled to said difference circuit means for integrating the difference between the rectified output and the reference standard over the period of acceleration of the motor from rest to operating speed, and means responsive to said integrating means for indicating objectionable noise level of the motor under test.

7. In testing apparatus for determining the noises of an electric motor during starting which are objectionable to the human ear, in combination, means for connecting an electric motor to be tested to a suitable source of electric energy to start the motor, a microphone disposed adjacent the motor being started to pick up the starting noises of the motor and to produce an alternating current output signal corresponding in frequency and amplitude to the starting noise of the motor, filter means for filtering out of said output signal all frequencies corresponding to the noises not objectionable to the human ear, rectifying means for rectifying the filtered output from said filter means, a magnetic core integrator, an output circuit, a voltage reference standard of direct current potential, said magnetic core integrator being connected to said voltage reference standard, said output circuit, and said rectifying means to produce an output in the output circuit responsive to the difference of their potential, and means responsive to said output in the output circuit to indicate the objectionable noise level of the motor under test.

8. In testing apparatus for determining the noises of an electric motor during starting which are objectionable to the human ear, in combination, means for connecting an electric motor to be tested to a suitable source of electric energy to start the motor, a microphone disposed adjacent the motor to pick up the starting noises of the motor and to produce an alternating current electric output signal corresponding in frequency and amplitude to the starting noise of the motor, filter means for filtering out of said output signal all frequencies corresponding to noises not objectionable to the human ear and retaining only those frequencies corresponding to the noises within a relatively narrow range including 240 cycles per second, which range is known to be objectionable to the human ear, rectifying means for rectifying the filtered output from said filter means, a magnetic core integrator, an output circuit, a voltage reference standard of direct current potential, said magnetic core integrator being connected to said voltage reference standard, said output circuit, and said rectifying means to produce an output in the output circuit responsive to the difference of their potential, and means responsive to the output in said output circuit for indicating the objectionable noise level of the motor under test.

References Cited in the file of this patent

UNITED STATES PATENTS

| | | |
|---|---|---|
| 1,907,415 | Carpenter et al. | May 2, 1933 |
| 2,340,714 | Traver et al. | Feb. 1, 1944 |
| 2,480,607 | Rackey et al. | Aug. 30, 1949 |
| 2,635,746 | Gordon | Apr. 21, 1953 |
| 2,799,015 | Bell | July 9, 1957 |
| 2,820,361 | Apps | Jan. 21, 1958 |
| 2,866,301 | Koulicovitch et al. | Dec. 30, 1958 |